Patented June 27, 1944

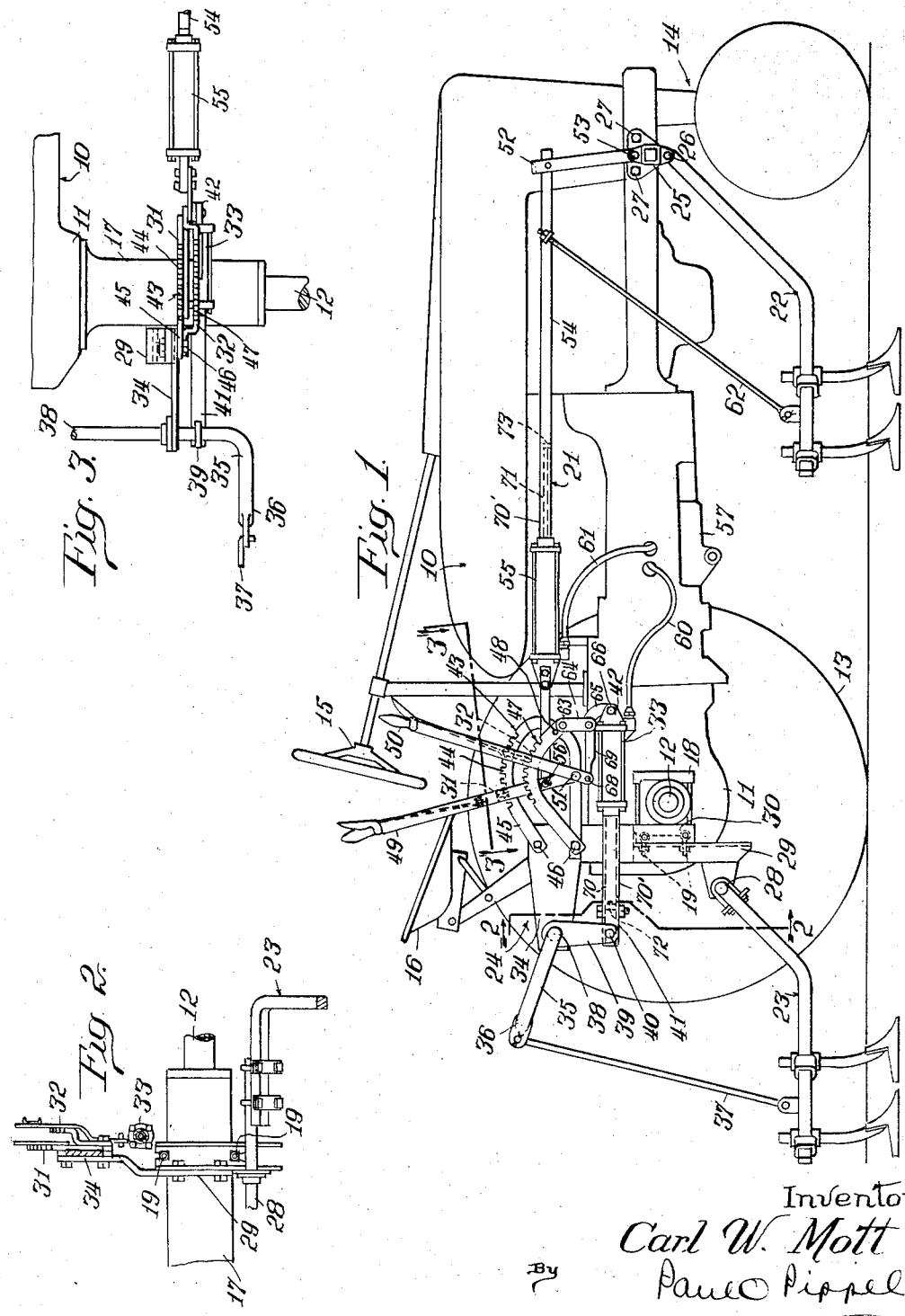

2,352,281

UNITED STATES PATENT OFFICE 2,352,281

WORKING TOOL ATTACHMENT

Carl W. Mott, La Grange, Ill., assignor to International Harvester Company, a corporation of New Jersey Application July 14, 1941, Serial No. 402,291

6 Claims. (Cl. 97—50)

This invention relates to working tool attachments adapted to be connected to tractor or other tool-supporting structures, and more particularly to adjusting mechanisms for adjusting the working tools which are connected for movement thereon from one position to another with respect to the tractor.

It is an object of the invention to provide in a working tool attachment a novel means for the attachment of the same to the tractor, wherein the adjusting mechanism including power-actuated devices is attachable to the tractor by a common bracket-supporting structure.

It is another object of the invention to provide in a bracket structure, adapted for the connection of a power-actuated device for bodily movement with respect thereto, a manually operable adjusting mechanism serving to effect bodily adjustment of the power-actuated device.

It is another object of the invention to provide a novel arrangement of manually operable adjusting devices, wherein one of the devices serves as a support for the other device, and wherein the adjustable devices also serve in part as a means for connecting of a power-actuated device on the common bracket structure.

According to the present invention, a bracket structure, adapted for attachment to the rear axle structure of the tractor, serves as a common support for the manually operable adjusting devices and for the power-actuated device, the latter being connected to the bracket structure for bodily movement, wherein, when the same is adjusted by the manually operable adjusting device, the working tool structure pivotally connected to the tractor or to the bracket structure, which is in turn connected to the tractor, may be adjusted when in one of its positions such as when the same is in the ground to effect thereby depth adjustment of the working tools. In addition, this same bracket structure also serves as a support for a manually adjustable operating device serving to adjust a second working tool structure positioned at another location on the tractor for movement to and from its working position. One of the manually operable adjusting devices is so formed and connected with the bracket structure that it serves as a support for a second manually operable adjusting device and as well as a support for a power-actuated device which is connected by one of its end portions thereto. The power-actuated device takes the form of a fluid cylinder device which has two end connecting portions. The other end portion is connected to a rockable structure also supported by the bracket structure. The fluid cylinder device is in this manner supported for bodily adjustment on the bracket structure. Except for removal of the working tool structure located at the forward portion of the tractor, the attachment and its adjusting mechanism is removable from the tractor by merely detaching the common bracket structure therefrom. This includes the removal of the rear working tool structure which also is connected to the bracket structure for vertical movement to and from its ground-working position. The bracket structure is so arranged that it is quickly attachable to the rear face of the rear axle structure, and the adjusting devices extend forwardly therefrom and above the rear axle structure to be accessible to an operator's station also located on the rear axle structure of the tractor.

For other objects and for a better understanding of the invention, reference may be had to the following detailed description taken in connection with the accompanying drawing, in which:

Figure 1 is a side elevational view of a tractor and of the working tool attachment embodying the features of the present invention;

Figure 2 is a view taken along the line 2—2 of Figure 1 and looking in the direction of the arrows thereof and illustrating the connection of the bracket structure to the rear axle structure; and, Figure 3 is a detailed plan view taken along the line 3—3 of Figure 1 showing a plan view of the bracket structure and of the adjusting device.

Referring to the drawing, there is shown a tractor 10 having a rear axle structure 11 through which there extends an axle 12 for driving the tractor drive wheels 13. The forward portion of the tractor is supported on a steerable wheel structure 14 adapted to be operated by a steering wheel mechanism 15 accessible to an operator's station 16 on the rear axle structure 11 of the tractor. The rear axle structure of the tractor, as seen in Figure 3, extends laterally and includes a housing 17 having thereon an attaching portion 18 with swinging bolts 19 serving as means by which the working tool attachments are connected to the tractor 10. In this regard it will be apparent that the tractor 10 serves as a tool-supporting structure for the attachment thereto of working tool attachments.

The working tool attachment, indicated generally at 21 includes a forward working tool structure 22, a rearward working tool structure 23, and adjusting mechanism, indicated generally at 24. The forward working tool structure 22 is pivotally connected to a bracket 25, as indicated at 26, and the bracket is in turn rigidly connected to the tractor 10 by means of the bolts 27. The rearward working tool structure 23 is pivotally connected as indicated at 28 to a bracket structure 29 serving as a support for the adjusting mechanism 24. This bracket structure 29 has an attaching portion 30 adapted to receive the swinging bolts 19 by which the bracket structure 29 is fixed to the tractor. This bracket structure 29 serves as a support for adjusting devices 31 and 32 and also as a means for supporting a fluid-actuated cylinder device 33 conforming a part of the power mechanism for moving the working tool structure 23 to and from its working position.

Extending rearwardly on the bracket structure 29 is a portion 34, which serves as a support for a rockable structure 35, having a rearwardly extending arm 36 to the outer end of which is connected the workable structure 23 by means of a lifting rod 37. Rigidly fixed to an axle portion 38 of the rockable structure 35 is a depending arm 39, to the lower end of which the fluid-actuated device 33 is attached, as indicated at 40. This arm 39 serves as a link element for supporting one end of the fluid-actuated device 33. The fluid-actuated device has two connecting portions 41 and 42. The arm 39 serves as a link for connecting the portion 41 with the bracket structure 29.

The adjusting device 31 includes a quadrant element 43 having a toothed portion 44 and an untoothed portion 45. The quadrant 43 is formed of scrap material bent back upon itself to form a loop, the ends of which are connected to the bracket structure 29 by a bolt means 46. In the connection of the quadrant 43 to the bracket structure 29, it would appear that the same is substantially secure as to being a part of the bracket structure and to provide, as such, means for the attachment of other parts adapted to be supported by the bracket structure.

The second adjusting device 32 includes a quadrant 47 having mainly a toothed portion 48 and this quadrant element is attached to and carried by the quadrant element 43 of the adjusting device 31. The attachment is made to the quadrant 43, as indicated at 48. The adjusting devices 31 and 32 have respectively working levers 49 and 50, each of which has the usual latch mechanism and is adapted to work over the respective tooth portions of the respective quadrants. However, both of the levers 49 and 50 are pivotally connected to the untoothed portion 45 of the quadrant element 43. It should thus be apparent that the quadrant 43 thereby serves as a common support for the levers which are pivoted thereto, as indicated at 51.

On the bracket structure 25, serving as a support for the forward working tool structure 22, there is pivoted a lever element 52, as indicated at 53, to the free end of which is connected a lifting pipe 54 having a fluid-actuated cylinder 55 and attached for bodily adjustment to the lever 49 of the first adjusting device, as indicated at 56. The fluid-actuated cylinder 55 is similar to the fluid-actuated device 33, and both of these receive fluid power from a fluid source within the body of the tractor. This fluid source includes a housing 57 adapted to fit within the body of the tractor and in which there is disposed a fluid pump adapted to be driven by the tractor, the fluid from which may be controlled by a control mechanism which is also disposed within the housing 57. This fluid arrangement may be of the form shown in the pending application, Serial No. 326,059 in the name of the present inventor and related to a hydraulic lifting control valve. It will be sufficient for the present description to state that fluid under pressure is provided and that it is delivered to the respective fluid-actuating devices 33 and 55 through hose connections 60 and 61, respectively.

The lifting pipe 54 is thrust forwardly by the fluid-actuated device 55 which reacts against the adjusting device 31, and the lever 52 is rotated in a clockwise direction about the pivot 53. Connected by the lifting pipe 54 and the forward rig structure 22 is a lifting rod 62 which will be moved forwardly and upwardly as the lever 52 is rotated, thereby effecting a lifting movement of the working tool structure 22. When it is desired to adjust the working tool structure 22 in one of its positions, such as when in its ground-working position, the operator seated on the operator's station 16 adjusts the lever 49 over the quadrant 43. This adjusting device, forming a part of the bracket structure, supports in part the fluid-actuated device 55.

The quadrant 47 has a forwardly extending projection 63 which extends beyond its point of connection 48 with the quadrant 43. Pivoted loosely on the projection 63 is a link 64 to the lower end of which is pivoted a link 65 as indicated at 66. These two links 64 and 65 serve as a means for the connection of the fluid-actuated device 33 to the bracket structure 29 and its connecting portion 42, the link 65 being connected to the connecting portion 42, as indicated at 66. It should thus now be apparent that the fluid-actuated device 33 is connected to the bracket structure 29 for bodily adjustment with respect thereto. As a means for bodily adjusting the cylinder device 33, which serves as the power means for lifting the rear working tool structure 23, the second manually operable adjusting device 32 is provided. To the lower end of the lever 50, as indicated at 68, there is connected an extension 69 of the link 65. This extension 69 extends rearwardly from the point of interconnection of the links 64 and 65. As the lever 50 is worked over the quadrant 47, the fluid-actuated device is bodily adjusted whereby the working tool structure will be adjusted, such as when it is desired to change the working depth of the working tools thereof.

The fluid-actuated devices 33 and 55 are each of the extensible type including a piston rod and piston located within the cylinder. The piston rods are respectively indicated at 70 and 71. Surrounding the piston rod 70 is a sleeve portion 70' in which the piston rods operate. The piston rod 70 abuts a stop 72 in the sleeve portion 70' and causes a clockwise rotation of the rockable structure 35, whereby the rear working tool structure 23 is lifted to its transport position. In this operation the fluid-actuating device 33 reacts against the fixed link 65 fixed with the bracket structure by means of the adjusting device 32. The fluid-actuated device 55 reacts against the manually operable adjusting device 31 and its piston rod 71 reacts against a stop 73 within the lifting pipe 54 wherein the rod 71 is axially slidable.

It should now be apparent that there has been provided a single bracket structure which serves as a support for the lifting and adjusting mechanism, which forms a part of a working tool attachment adapted to be connected to a tractor or tool-supporting structure, and that means has been provided for the attachment of a power-actuated device to a bracket structure for bodily adjustment with respect thereto, whereby the same may be adjusted to effect depth adjustment of a working tool structure connected to the tractor for movement with respect thereto or to the same bracket structure to which the fluid-actuated device is connected. It should also be apparent that a simplified arrangement of a plurality of manually operable adjusting devices has been provided, wherein one of the adjusting devices serves as a support for the other adjusting device, and also wherein one of the adjusting devices serves as a support for the fluid-actuated device. While the illustration shows the working tool attachment as being on but one side of the tractor, it will be apparent that a similar arrangement may be provided at the opposite side of the tractor incorporating the use of two more fluid-actuated devices properly connected to the fluid-actuated source to receive fluid simultaneously with the fluid-actuated devices 33 and 55.

While various changes may be made in the detailed construction of the present invention, it should be understood that such changes shall be within the spirit and scope of the present invention as defined by the appended claims.

What is claimed is:

1. In combination, a tool-supporting structure, a working tool structure connected to the tool-supporting structure for movement from one position to another position, power means for moving the working tool structure including a power-actuated device having two connecting portions, means for connecting the power-actuated device to the tool-supporting structure for bodily adjustment including depending swingable link structures respectively connected to the connecting portions of the power-actuated device, and means for bodily adjusting the power-actuated device to effect adjustment of the working tool structure.

2. In combination, a tractor, a ground-working tool structure connected to the tractor for vertical movement to and from its ground-working position, a bracket structure adapted for attachment to the tractor, power means for moving the working tool structure including a power-actuated device having two connecting portions, means for connecting the power-actuated device to the bracket structure for bodily adjustment including depending swingable link structures respectively connected to the connecting portions of the power-actuated device, and means for bodily adjusting the power-actuated device to effect depth adjustment of the working tool structure in its ground-working position.

3. In combination, a tool-supporting structure, a working tool attachment for the tool-supporting structure including a bracket structure connected to the tool-supporting structure, working tools adapted to be adjusted with respect to the tool-supporting structure, manually operable adjusting devices for the respective working tools and of which one includes a quadrant element connected to the bracket structure and having a toothed portion and an untoothed portion, a second quadrant element attached to the first-mentioned quadrant element and also having a toothed portion, and a pair of levers adapted to be worked respectively over the respective quadrants, both of said levers being pivoted on the untoothed portion of said first-mentioned quadrant element.

4. In combination, a tractor having a rear axle structure with a rear face portion and an operator's station carried by the rear axle structure, a ground-working tool attachment adapted for attachment to the tractor including a bracket structure adapted for attachment to the rear face of the rear axle structure, working tools connected to the tractor for vertical adjustment, manually operable adjusting devices for the respective working tools including a quadrant element connected to the bracket structure to extend forwardly of and above the rear axle structure to a location accessible to the operator's station, said quadrant element having a toothed portion and an untoothed portion, a second quadrant element attached to the first-mentioned quadrant element and including mainly a toothed portion, and lever elements adapted to be worked respectively over the respective quadrant elements, the said levers being pivoted on the untoothed portion of said first-mentioned quadrant element, whereby said adjusting devices are placed in a location accessible to the operator's station.

5. In combination, a tool-supporting structure, a working tool attachment connected to the tool-supporting structure including a bracket structure, the working tool adapted for movement with respect to the tool-supporting structure, power means for moving the working tool including a power-actuated device, manual operable adjusting devices carried by the bracket structure including a quadrant and lever element, means for connecting the power-actuated device to the bracket structure for bodily adjustment including means for connecting the same with the quadrant element whereby the latter serves as a support for the power-actuated device, and means for connecting the power device with the lever element whereby bodily adjustment of the device may be effected.

6. In combination, a tool-supporting structure, a working tool attachment connected to the tool-supporting structure including a bracket structure carried by the tool-supporting structure, the working tool structures adapted to be adjusted with respect to the tool-supporting structure, manually operable adjusting devices for the respective working tool structures one of which including a quadrant element carried by the bracket structure, the other of said devices including a quadrant element connected to the first-mentioned quadrant element, power means for adjusting one of the working tool structures including a power-actuated device having connecting portions, means for connecting the power-actuated device to the bracket structure for bodily adjustment including means for the attachment of one of its portions to the second-mentioned quadrant element, whereby said latter quadrant element serves as a means for the attachment of the power-actuated device to the first-mentioned quadrant element and of the bracket structure.

CARL W. MOTT.